April 27, 1954 — W. N. LINDSAY — 2,676,668
APPARATUS FOR CONTACTING GASEOUS FLUIDS AND GRANULAR SOLIDS
Filed June 13, 1949 — 2 Sheets-Sheet 1
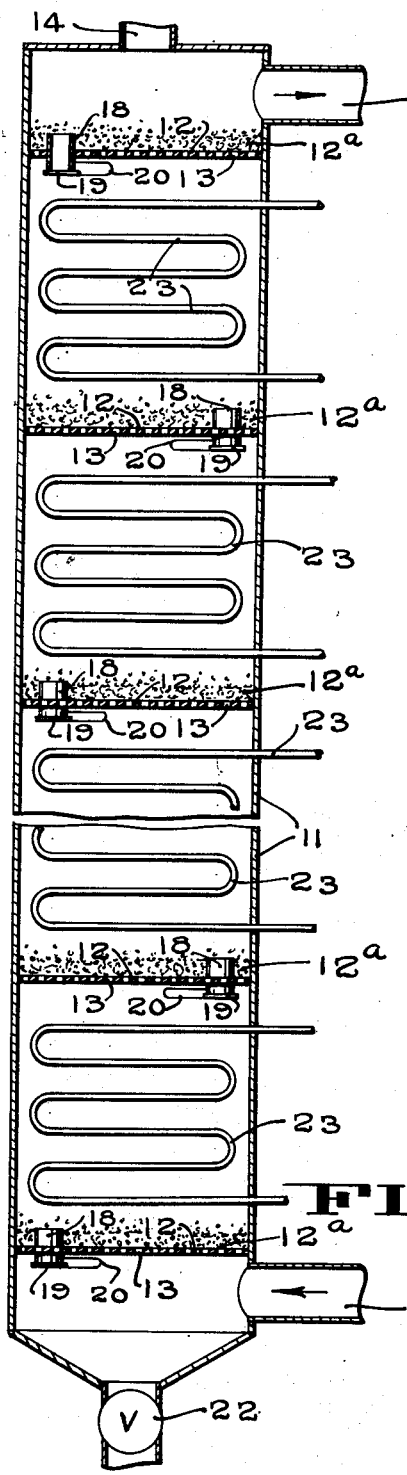
FIG_1
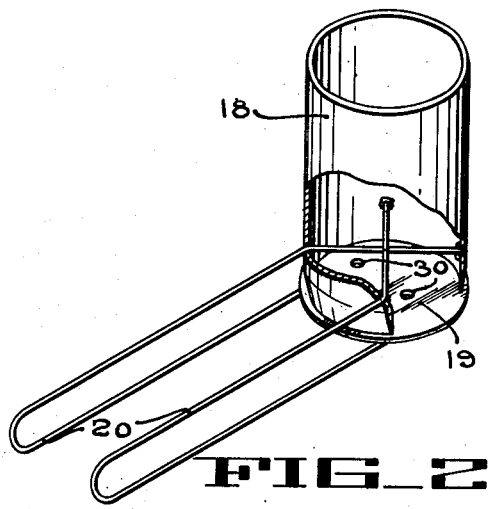
FIG_2
INVENTOR
WESLEY N. LINDSAY.
BY Hans G. Hoffmeister
ATTORNEY

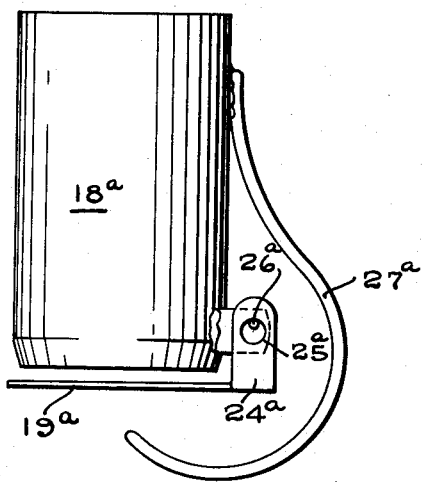
FIG_3
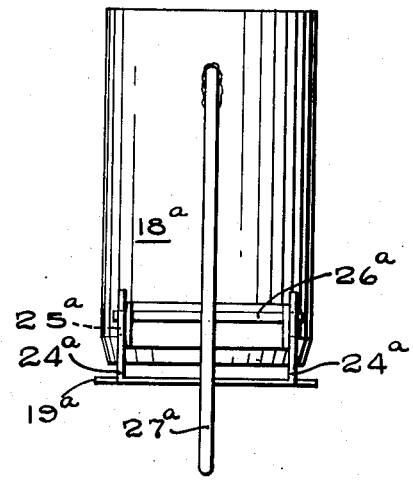
FIG_4
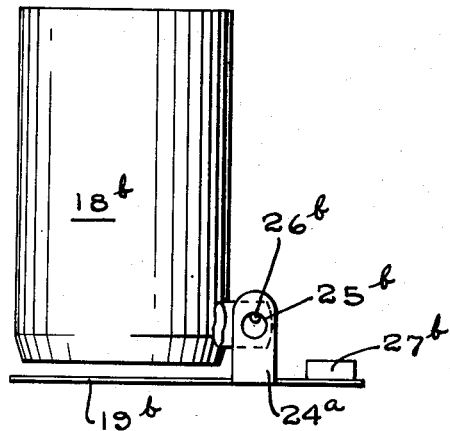
FIG_5
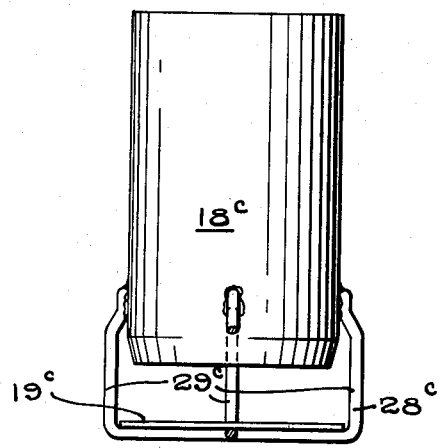
FIG_6

Patented Apr. 27, 1954

2,676,668

UNITED STATES PATENT OFFICE 2,676,668

APPARATUS FOR CONTACTING GASEOUS FLUIDS AND GRANULAR SOLIDS

Wesley N. Lindsay, San Jose, Calif., assignor to Food Machinery and Chemical Corporation, San Jose, Calif., a corporation of Delaware Application June 13, 1949, Serial No. 98,814

9 Claims. (Cl. 183—4.2)

The present invention relates to apparatus adapted to effect contact of desired duration between a stream of gas or vapor and a continuously flowing supply of granular solids, in the form of fluidized beds within a relatively limited space. More particularly the present invention relates to mechanism for controlling the flow of the granular solids in apparatus of the type characterized wherein the solids are passed countercurrently through a rising stream of gas or vapor.

Apparatus of the type referred to comprise usually within an enclosure an array of vertically superposed perforated plates, and the granular solids are supplied to the apparatus at the top thereof, while the gas or vapor enters said enclosure at the bottom so that it may rise through the perforations of the plates. The force of the gas or vapor is arranged to be sufficiently strong to prevent any appreciable portion of the solids from dropping through the perforations and to produce the desired phenomenon of dense-phase-fluidization upon each of said plates, but in order that the solids may eventually reach, and be discharged at, the bottom of the apparatus and may thus be processed in a continuous stream, suitable downspouts are provided in each of said plates through which the solids may gradually drop from plate to plate. Such spouts present ordinarily paths of minimum resistance to the upward flow of the gas or vapor currents and it has, therefore, been necessary to extend them sufficiently far in downward direction for their open lower ends to dip into the mass of fluidized solids on the lower bed plates in order to form a seal of sorts which impedes entrance of the rising gas or vapor; otherwise the gaseous fluids would sweep freely through said spouts with the result that the solids would not be able to pass downwardly therethrough. The described manner of sealing the spouts however, is far from perfect. First of all, before operation can be started the apparatus must be carefully primed by intermittently starting and shutting off the supply of gases while granular solids are poured into the apparatus at the top end thereof, to form accumulations of granular solids at the lower ends of the downspouts; and only after the downspouts have thus been sealed against free entrance by the gas or vapor currents, may the operation of the apparatus be uninterruptedly continued. Moreover, after operation of the apparatus has been properly started, there is a tendency for the granular solids to form concentrations at and near the bottom ends of the spouts which may become so dense that the gas or vapor currents will by-pass the area around the downspouts and thus fail to fluidize and remove the solids accumulating in this area, with the result that eventually the downflow of the solids through the spouts may be entirely blocked; to be sure, it is possible to minimize this danger by causing a large pressure drop to appear across the perforated bed plates in comparison with the difference that may develop between the pressure drops across the stagnant solids at the down spouts and the fluidized solids in the remaining areas of the bed, but an arrangement of this type increases the pumping charges necessary to operate the system very materially and in all cases requiring many such superposed beds, may increase the operational cost of the apparatus to an extent where it is no longer profitable to employ fluidized beds. In addition increased pumping pressures increase the ever present danger of sudden blow-outs of some of the fluidized beds through the down spouts, which necessitate interruption of whatever process may be performed in the apparatus in order that the down spouts may be newly primed.

Another disadvantage of a down-spout arrangement, of the type referred to, is the fact that these spouts extend vertically through practically the total space between each two superposed beds and thus render difficult the installation of heat exchanger pipes which are often required in systems of the type referred to, to cool or heat the gas or vapor stream, depending upon the particular process maintained in the apparatus.

It is an object of the present invention to provide an apparatus adapted to form a plurality of superposed fluidized beds that requires no priming to commence operation.

Still another object is to provide an apparatus, of the type referred to, wherein the danger of bed blow-outs is completely eliminated.

An additional object is to furnish an arrangement of superposed fluidized beds which provides continual downward flow of the granular solids without the necessity of extending the downspouts into the lower beds.

Furthermore, it is an object to provide an arrangement, of the type referred to, wherein most of the space between the bed plates is left free for the installation of heat exchanger devices.

Additionally, it is an object to provide a multistage fluidized bed arrangement, wherein the individual fluidized beds are uniformly maintained in fluidized condition without the appearance of solid concentrations.

Yet another object is to provide an arrangement, of the type referred to, wherein the individual bed plates are arranged to develop a minimum pressure drop and yet no concentrations of granular solids will occur below the downspouts or in any other portion of the beds. In this connection it is still another object of the invention to provide a multi-stage fluidized bed arrangement that may be operated with a minimum of pressure These and other objects of my invention will be apparent from the following description of the accompanying drawings which illustrate certain preferred embodiments thereof and wherein Figure 1 is a diagrammatical vertical section through a multi-stage fluidized bed apparatus embodying my invention, Figure 2 is a perspective detail view illustrating the construction of the down-spouts employed in the apparatus shown in Figure 1, Figure 3 is an elevational detail view illustrating a modified down-spout construction in accordance with my invention, Figure 4 is a side elevation of the down-spout illustrated in Figure 3, and Figures 5 and 6 are detail views similar to Figure 3, illustrating further modifications of the down-spout construction of my invention.

In accordance with my invention I provide the down-spouts of the fluidized bed supports with valve mechanisms normally tending to close the spouts when said spouts are empty, and arranged to open them under the weight of a predetermined amount of solids accumulated within their interior. By means of such valving mechanisms operation of the fluidizing apparatus may be commenced without priming its down-spouts because said valving mechanisms will prevent upward flow of the gases or vapors through the spouts as long as they are empty, and will open them only after a plug of solids has gathered therein, to close them again as soon as the solids in the spout, or a predetermined portion thereof, has emptied onto the bed below. Hence, the gases or vapors are at no times permitted to sweep freely through the spouts and by-pass the plate perforations, and thus there is no possibility for said gases or vapors to evade their task of fluidizing the solids on the bed plates nor is there any danger for bed blow-outs to occur. Moreover the length of the down-spouts may be made very short so that most of the space between the superposed bed plates may be saved for heat exchangers or whatever other equipment it may be desirable to install therein. Also, the pressure drop across the bed plates may be made very small to keep the operational costs at a minimum, without impairing uniformity of fluidization; in fact the beds will be of utmost stability irrespective of sudden disturbances, such as fluctuations in the velocity of the gas or vapor currents or changes in the supply of the granular solids.

Figure 1 illustrates an array of vertically superposed fluidized beds, such as may be employed for removing water vapor from the effluent gases of a Wisconsin Nitrogen Fixation furnace. These gases contain usually small quantities of nitric oxide, carbon dioxide, relatively large quantities of nitrogen and oxygen, and a certain percentage of water vapor, and in the recovery of the nitric oxide from said gas mixture it is first necessary to remove the water vapor to reduce the dew point of the gas mixture to a level of say —60° F. For this purpose a blower (not shown) may be arranged to direct the gas mixture through a feed pipe 10 into the interior of a drying tower 11 within which are mounted a plurality of superposed horizontal bed plates 12. Said plates are perforated as indicated at 13 and as the gases rise in numerous currents through the perforations of said plates, granules of a solid adsorbent, such as silica gel, are poured in a continuous stream into the tower 11 through an entrance pipe 14 at the top thereof. The gases are finally permitted to escape from the tower through a lateral discharge pipe 15, as indicated by an arrow in Figure 1.

The diameter of the perforations in the bed plates may be larger than the diameter of the solid granules and the velocity imparted to the rising gas stream by the blower is so chosen as to impart sufficient buoyancy to the granules to maintain them in a swirling mass above the bed plates. In the exemplary embodiment of the invention, which I am about to describe, the average size of the granular solids was of the order of .05 inch, while the diameter of the perforations in the bed plates was about .19 inch, and the velocity of the upwardly directed gas stream was of the order of five feet per second.

Extending through each of the bed plates 12 at points near the side wall of the drying tower 11 are short vertical pipes or spouts 18 which are preferably of a larger diameter than the perforations in the bed plates. For instance, while the perforations in the bed plates may have a diameter of about .19 inch, as indicated above, the diameter of the spouts 18 may be of the order of 2 inches. Said spouts extend only a short distance below their respective bed plates, as shown in Figure 1 and they may also project a short distance above the level of said plates to establish fluidized beds of a desired depth thereon. For instance, in an embodiment, wherein the vertical distance between each two superposed bed plates is of the order of 12 inches, the spouts 18 may be of such length and position relative to their respective bed plates as to extend only about 1 inch below said plates, while extending 2 inches above the level of said plates.

Disposed below the bottom opening of each of said spouts 18 is a thin circular lid plate 19 resiliently held in closed or partially closed position by two spring members 20 that are suitably secured to each respective spout as shown in Figure 2. In neither case will a gas stream rising within the tower 11 be permitted to pass through the spouts, since the force of the rising gases that attempt to pass through the openings left by only partially closed lids will shut said lids against the end of their respective spouts. As the gas stream rises through the apertures 13 of the bed plates 12, however, some of the fluidized solids upon the uppermost bed plate 12 will continually spill over the upwardly projecting portion of the uppermost spout 18 and will drop into and accumulate within said uppermost spout; and eventually the weight of the accumulating granules will force the lid plate down and away from the lower end of said spout causing all, or the greater portion of, the accumulated solids to drop onto the lower bed plate where another fluidized bed will be established by the gas currents rising through the perforations of said lower bed plate; and as soon as the major portion of the granules in said uppermost spout 18 has been discharged onto the lower bed, the resiliency of the spring member 20 will restore the lid plate 19 to closed position and thus prevent the rising gas currents from rushing through the empty spout. In this manner continued flow of the granules into the spout is assured, while the rising gas stream is forced to continue its task of fluidizing the mass of granular solids upon the uppermost bed plate. Alternately, the weight of the solids spilling continuously into the spout and the force of the rising gas or vapor currents may adjust the lid plate to a partially open position in which about the same amount of granular solids is permitted to flow continuously from the bottom of the spout as enters said spout at the open top end thereof, so that there will be a continuous stream of solids through the spout from the upper to the lower bed.

The described occurrences will periodically continue in the uppermost and every newly established fluidized bed until such fluidized beds have been formed on all the bed plates 12, as indicated at 12a in Figure 1, whereafter the granular solids will travel in a continuous flow through all the fluidized beds from the top to the bottom of the drying tower where they may be discharged through an exit valve 22. To avoid the possibility that the granular solids may by-pass any of the bed plates 12 in dropping from the spouts 18, the spouts of successively lower plates are preferably located at diametrically opposite points, as clearly shown in Figure 1.

The fluidized flow of the granular solids initiated in the manner described above may be stopped and started anew at any time without requiring special servicing, and the downwardly directed portion of the spouts 18 may be made so short that the major portion of the space between the superposed bed plates is available for installation of heat exchangers, as indicated by the heat exchanger pipes 23 in Figure 1, which in the exemplary embodiment of the invention that I am about to describe, are arranged to remove heat from the interior of the drying tower.

Figures 3 and 4 illustrate a modified construction of the valving mechanism employed in the apparatus of the invention. In this construction the lid plate 19a is hingedly supported from the outer wall of the spout 18a. For this purpose a pair of ears 24a, rising from said lid 19a, are provided with enlarged apertures 25a that are engaged by a horizontally positioned hinge rod 26a. In the particular embodiment illustrated in Figures 3 and 4 the arrangement is such that ordinarily the lid 19a is slightly ajar which may be achieved by making the apertures 25a substantially larger than required for the hinge rods 26a. Thus, while the spout 18a is ordinarily slightly open as shown rising gas currents will raise the lid with its aperture ears 24a above the hinge rod 26a and hold it closely against the bottom end of the open spout 18a. Likewise supported from the outer wall of the down spout 18a is a stop member 27a which positively limits the angle by which the lid plate may swing away from the end of the spout. Said stop member is arranged to retain the lid plate in a condition where the rising currents of the fluidized gas or vapor will urge it into closed position. Thus there is no possibility for failures in the operation of the device that would result if the lid were permitted to swing completely away from the spout.

The embodiment illustrated in Figure 5 is similar to the embodiment illustrated in Figures 3 and 4 in that the lid 19b is hingedly connected to the outer wall of the down spout 18b as indicated at 25b, but instead of the stop member a counterweight 27b prevents excessive opening of the lid and maintains it in a position in which the force of the gas or vapor currents is effective to urge it against the open bottom of the spout.

In the embodiment illustrated in Figure 6 a cage 28c is attached to the lower end of the spout 18c by means of a number of upwardly directed prongs 29. Said cage is arranged to hold a lid plate 19c near the open end of the down spout. Said plate lies loosely within the cage 28c and is free to move vertically toward, or away from, the opening of the spout, depending upon whether or not the weight of solids accumulating on the lid overcomes the force of the upwardly directed gas or vapor currents. Thus, whenever the rush of gases or vapors toward the spout becomes excessive the lid plate 19c will automatically close the spout, yet the lid will open the spout against the force of said gases or vapors whenever a sufficiently large amount of solids has accumulated in the interior thereof.

In the event that solids are employed that exhibit an unusual tendency to pack, the lid plates in any one of the above described embodiments of the invention may be perforated, as indicated at 30 in Figure 2 to admit limited currents of gas or vapor into the spouts, even though the lids may be completely closed. Such an arrangement helps to maintain the solids within the interior of the pipes 18 in a state of relatively loose aggregation and in this manner prevents failures in the operation of the apparatus due to clogging of the down spouts.

While I have described my invention with the aid of an exemplary embodiment thereof, it will be understood that I do not wish to be limited to the particular constructional details shown or described which may be departed from without departing from the scope of my invention. Thus, the fluidizing apparatus may contain more or less fluidized beds than actually shown, and the dimensions of the down spouts, the plate perforations and the granular solids employed may greatly vary, depending upon the nature of the process which the apparatus of my invention is employed to serve. Further, valving mechanisms, other than those specifically disclosed, yet operating in the manner required by my invention may be devised by those skilled in the art and associated with the down spouts without departing from the spirit of the invention. Furthermore, while I have illustrated the usefulness of my invention with a process for drying the effluent gases of a Wisconsin Nitrogen furnace, it will be understood that the apparatus of my invention is by no means limited to this particular use, but may usefully be employed for many purposes such as for desorbing adsorbed gases from granular adsorbents or for contacting gases with granular catalysts in a continuous process.

Having thus described my invention, what I claim as new and desire to protect by Letters Patent is:

1. Apparatus for contacting granular solids and gaseous fluids in continuous counter flow comprising an enclosure, means for delivering granular solids into said enclosure at the upper end thereof, means for discharging the granular solids from said enclosure at the lower end thereof, a plurality of vertically spaced perforated supports arranged to partition said enclosure into a plurality of superposed chambers, conduits connecting each two superposed chambers, means for introducing gaseous fluids at the lower end of said enclosure at a rate adapted to fluidize the granular solids upon said perforated supports, said conduits having their lower ends disposed above the level of the fluidized mass formed on the perforated supports underneath, load responsive gate means associated with each of said conduits, each comprising a lid and means operable to guide the lid upon accumulation of granular solids thereon into a position wherein the conduit is open and also operable in response to an opposing force applied to said lid to move said lid into a position wherein it closes the conduit means for releasing the gaseous fluids from said enclosure at the upper end thereof.

2. Apparatus according to claim 1 wherein said lid guiding means comprises a cage having a plurality of upwardly extending vertical prongs secured to the lower end of the respective conduit, said lid being loosely supported within said cage.

3. Apparatus for contacting granular solids and gaseous fluids in continuous counterflow comprising an enclosure, means for delivering granular solids into said enclosure at the upper end thereof, means for discharging the granular solids from said enclosure at the lower end thereof, means for introducing gaseous fluids at the lower end of said enclosure, means for releasing the gaseous fluids from said enclosure at the upper end thereof, a plurality of vertically spaced, perforated supports arranged to partition said enclosure into a plurality of superposed chambers, conduits connecting each two superposed chambers and associated with each of said conduits, load responsive gate means comprising a lid and means for supporting said lid in such a manner that it yields under the weight of granular solids within said conduit from a position wherein it effectively closes its respective conduit to positions opening said conduit to varying degrees in accordance with the amount of granular solids accumulating therein, said lids possessing a number of perforations to permit a limited flow of gaseous fluid through said conduits when in closed position.

4. In an apparatus for contacting granular solids and gaseous fluids a bed construction comprising a horizontally positioned perforated support, a conduit extending through and projecting a limited distance below said support, and load responsive gate means associated with said conduit and comprising a lid and means for supporting said lid in such a manner that it yields from a position wherein it effectively closes said conduit to positions opening said conduit to varying degrees in accordance with the amount of granular solids accumulated therein.

5. In an apparatus for contacting granular solids and gaseous fluids a bed construction comprising a horizontally positioned perforated plate, a spout extending through and projecting a limited distance below said plate, a lid provided at the bottom end of said spout and a spring member yieldably urging said lid toward the bottom end of said spout.

6. Apparatus for contacting granular solids and gaseous fluids in continuous counterflow comprising an enclosure, means for delivering granular solids into said enclosure at the upper end thereof, means for discharging the granular solids from the enclosure at the lower end, a plurality of vertically spaced perforated supports arranged to partition said enclosure into a plurality of superposed chambers, conduits connecting each two superposed chambers, means for introducing gaseous fluids at the lower end of said enclosure at a rate adapted to fluidize the granular solids upon said perforated supports, said conduits having their lower ends disposed above the level of the fluidized mass formed on the perforated supports underneath, load responsive gate means associated with each of said conduits and each comprising a lid and means for supporting said lid in such a manner that it yields under the weight of granular solids within the conduit from a position wherein it effectively closes its respective conduit to positions wherein it opens said conduit, and means for releasing the gaseous fluids from said enclosure at the upper end thereof.

7. In an apparatus for contacting granular solids and gaseous fluids, a bed construction comprising a horizontally positioned perforated plate, a spout extending through and projecting a limited distance below said plate, a lid provided at the bottom end of said spout, and means for supporting said lid in such a manner that it yields under the weight of granular solids within said spout from a position wherein it effectively closes said spout to a position wherein it opens said spout to an extent dependent upon the amount of granular solids contained therein.

8. Apparatus for contacting granular solids and gaseous fluids in continuous counterflow comprising an enclosure, means for delivering granular solids into said enclosure at the upper end thereof, means for discharging the granular solids from said enclosure at the lower end thereof, a plurality of vertically spaced perforated supports arranged to partition said enclosure into a plurality of superposed chambers, means for introducing gaseous fluids at the lower end of said enclosure at a rate adapted to fluidize the granular solids upon said perforated supports, means for releasing the gaseous fluids from said enclosure at the upper end thereof, a conduit connecting each two superposed chambers, said conduits having their lower ends disposed above the level of the fluidized mass formed on the perforated supports underneath, load responsive gate means in the form of a lid associated with each of said conduits, hinge means connecting said lid to its respective conduit at the lower end thereof in such a manner that it yields under the weight of granular solids within said conduits from a position wherein it effectively closes its respective conduit to positions opening said conduit to varying degrees in accordance with the amount of granular solids accumulating therein, and stops arranged to limit opening of said lids to angles of less than 90°.

9. Apparatus for contacting granular solids and gaseous fluids in continuous counterflow comprising an enclosure, means for delivering granular solids into said enclosure at the upper end thereof, means for discharging the granular solids from said enclosure at the lower end thereof, a plurality of vertically spaced perforated supports arranged to partition said enclosure into a plurality of superposed chambers, means for introducing gaseous fluids at the lower end of said enclosure at a rate adapted to fluidize the granular solids upon said perforated supports, means for releasing the gaseous fluids from said enclosure at the upper end thereof, a conduit connecting each two superposed chambers, said conduits having their lower ends disposed above the level of the fluidized mass formed on the perforated supports underneath, and a load responsive gate means associated with each conduit and comprising a cage disposed below the bottom end of each of said conduits and a horizontal lid loosely supported in each cage for vertical movement toward and away from the lower end of its respective conduit.

References Cited in the file of this patent

UNITED STATES PATENTS

| Number | Name | Date |
| --- | --- | --- |
| 2,367,281 | Johnson | Jan. 16, 1945 |
| 2,367,694 | Snuggs | Jan. 23, 1945 |
| 2,444,990 | Hemminger | July 13, 1948 |
| 2,463,662 | Wallace | Mar. 8, 1949 |
| 2,465,255 | Moorman | Mar. 22, 1949 |
| 2,494,016 | Taylor | Jan. 10, 1950 |
| 2,525,925 | Marshall | Oct. 17, 1950 |